(12) United States Patent
Matsumoto et al.

(10) Patent No.: US 8,742,907 B2
(45) Date of Patent: Jun. 3, 2014

(54) ELECTRIC POWER INFORMATION PROVISION APPARATUS FOR AN ELECTRIC VEHICLE

(75) Inventors: Satoru Matsumoto, Nagoya (JP); Hirohito Kawai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 74 days.

(21) Appl. No.: 13/533,417

(22) Filed: Jun. 26, 2012

(65) Prior Publication Data

US 2012/0280804 A1 Nov. 8, 2012

Related U.S. Application Data

(63) Continuation of application No. PCT/JP2010/063799, filed on Aug. 10, 2010.

(51) Int. Cl.
*G08B 21/00* (2006.01)

(52) U.S. Cl.
USPC ............ 340/425.5; 340/455; 340/636.1; 320/137

(58) Field of Classification Search
USPC ............ 340/455, 636.1, 425.5; 320/137
See application file for complete search history.

(56) References Cited

U.S. PATENT DOCUMENTS

| | | | |
|---|---|---|---|
| 5,614,808 A * | 3/1997 | Konoya et al. | 320/109 |
| 5,757,595 A * | 5/1998 | Ozawa et al. | 340/636.1 |
| 5,844,479 A * | 12/1998 | Walton | 340/479 |

FOREIGN PATENT DOCUMENTS

| | | |
|---|---|---|
| JP | A-6-62503 | 3/1994 |
| JP | A-8-201488 | 8/1996 |
| JP | A-2000-14165 | 1/2000 |
| JP | A-2000-102104 | 4/2000 |
| JP | A-2001-184406 | 7/2001 |
| JP | A-2001-312537 | 11/2001 |
| JP | A-2003-219502 | 7/2003 |
| JP | A-2006-234643 | 9/2006 |
| JP | A-2009-77558 | 4/2009 |
| JP | A-2009-232670 | 10/2009 |

OTHER PUBLICATIONS

Oct. 5, 2010 International Search Report issued in International Patent Application No. PCT/JP2010/063799 (with translation).

* cited by examiner

*Primary Examiner* — Jeffery Hofsass
(74) *Attorney, Agent, or Firm* — Oliff PLC

(57) ABSTRACT

A display apparatus includes a display section which is attached to an electric vehicle EV operable upon supply of electric power thereto and displays information regarding the electric power supplied to the electric vehicle EV; a determination section which determines whether or not the electric power supplied to the electric vehicle EV contains green electric power; and a display control section. In the case where the determination section determines that the electric power supplied to the electric vehicle EV contains green electric power, the display control section controls the display section such that the display color becomes green. In the case where the determination section determines that the electric power supplied to the electric vehicle EV does not contain green electric power, the display control section controls the display section such that the display color becomes red.

8 Claims, 10 Drawing Sheets

ELECTRIC POWER INFORMATION PROVISION APPARATUS FOR AN ELECTRIC VEHICLE

This is a Continuation of Application No. PCT/JP2010/063799 filed Aug. 10, 2010. The disclosure of the prior application is hereby incorporated by reference herein in its entirety.

TECHNICAL FIELD

The present invention relates to an electric power information provision apparatus including an information provision section which provides information regarding electric power supplied to an electric apparatus (for example, an electric vehicle) which operates upon supply of electric power.

BACKGROUND ART

Use of electric vehicles has started to spread. An electric vehicle includes a battery and an electric motor. The electric vehicle operates upon supply of electric power from the battery to the electric motor.

Japanese Patent Application Laid-Open (kokai) No. H8-201488 discloses a technique regarding an apparatus for displaying the remaining capacity of a battery mounted on an electric vehicle. This remaining capacity display apparatus includes correction data calculation means for reading out from memory a correction amount corresponding to the degree of deterioration of the battery. The remaining capacity display apparatus displays the remaining capacity of the battery on a remaining capacity display section in consideration of the correction amount read out by the correction data calculation means.

DISCLOSURE OF THE INVENTION

Incidentally, in recent years, use of green electric power has been proposed so as to prevent emission of greenhouse effect gas, to thereby promote environmental protection. In Japan, the Green Energy Certification Center defines green electric power as electric power generated by use of renewable energy (green energy) which satisfies all the following conditions.
(1) The energy is not produced from fossil fuel such as petroleum, coal, or natural gas.
(2) The energy is not nuclear energy.
(3) Power generation through use of the energy involves no emission or a very low level of emission of greenhouse effect gas and harmful gas such as sulfur oxide or nitrogen oxide.

Examples of power generation schemes which use green energy satisfying the above-mentioned conditions include wind power generation, solar power generation, biomass power generation, hydraulic power generation, geothermal power generation, and fossil fuel/biomass mixed combustion power generation.

Promotion of use of green electric power contributes to environmental protection, such as prevention of global warming. Furthermore, not only promotion of use of green electric power but also promotion of use of electric power of a specific type (hereinafter referred to as "specific electric power") may contribute to achievement of a specific objective (e.g., saving of electric bill) which a user of an electric apparatus considers desirable to achieve.

The present invention has been accomplished under the above-described circumstances, and its object is to promote use of specific electric power in an electric apparatus, such as an electric vehicle, which operates upon supply of electric power thereto.

The present invention discloses an electric power information provision apparatus which comprises an information provision section which is attached to an electric apparatus operable upon supply of electric power thereto and provides information regarding the electric power supplied to the electric apparatus; a determination section which determines whether or not specific electric power is contained in the electric power supplied to the electric apparatus; and an information provision control section which controls the information provision section such that an informing mode of the information provision section changes depending on the result of the determination by the determination section.

In this case, preferably, the information provision control section controls the information provision section as follows. In the case where the determination section determines that the electric power supplied to the electric apparatus contains the specific electric power, the information provision control section controls the information provision section such that the informing mode becomes a first informing mode. In the case where the determination section determines that the electric power supplied to the electric apparatus does not contain the specific electric power, the information provision control section controls the information provision section such that the informing mode becomes a second informing mode different from the first informing mode.

According to the electric power information provision apparatus of the present invention, the informing mode of the information provision section changes depending on whether or not the specific electric power is contained in the electric power supplied to the electric apparatus operable upon supply of electric power thereto. The information provision section informs use of electric power containing the specific electric power, in a specific informing mode different from that in the case where electric power which does not contain the specific electric power is used. Accordingly, through recognition of the specific informing mode, a user of the electric apparatus can have assurance for use of the specific electric power. Such assurance motivates the user to use the specific electric power. As a result, use of the specific electric power is promoted.

The information provision section of the electric power information provision apparatus of the present invention is attached to the electric apparatus itself, which uses electric power whose information is provided by the information provision section. Therefore, people around the electric apparatus are informed of the fact that the specific electric power is used for operation of that electric apparatus. Thus, the people around the electric apparatus pay attention to the user of the electric apparatus. Such attention further motivates the user of the electric apparatus to use the specific electric power. As a result, use of the specific electric power is promoted further. Moreover, there is expected an additional effect of prompting the people around the electric apparatus to use the specific electric power.

The determination section determines whether or not the electric power supplied to the electric apparatus contains the specific electric power. Preferably, the determination section determines whether or not the electric power supplied to the electric apparatus contains electric power generated by specific means. For example, the determination section may determine whether or not the electric power supplied to the electric apparatus contains electric power generated through wind power generation, or determine whether or not the electric power supplied to the electric apparatus contains electric power generated through solar power generation. Alternatively, the determination section may determine whether or not the electric power supplied to the electric apparatus contains electric power generated by specific means (for example, by means of in-house power generation) from the viewpoint of lowering electric bill.

Preferably, the determination section determines whether or not the electric power supplied to the electric apparatus contains green electric power (electric power generated by use of green energy). By virtue of this configuration, the informing mode of the information provision section changes depending on whether or not the electric power supplied to the electric apparatus contains green electric power. The information provision section informs use of electric power containing green electric power, in a specific informing mode different from that in the case where electric power which does not contain green electric power is used. Accordingly, through recognition of the specific informing mode, a user of the electric apparatus can have assurance for contribution to environmental protection through use of green electric power. Such assurance motivates the user to use green electric power. As a result, use of green electric power is promoted. Also, people around the electric apparatus are informed of the fact that green electric power is used for operation of the electric apparatus. Thus, the people around the electric apparatus pay attention to the use of the electric apparatus. Such attention further motivates the user of the electric apparatus to use green electric power. As a result, use of green electric power is promoted further. Moreover, there is expected an additional effect of prompting the people around the electric apparatus to use green electric power.

Notably, although the Green Energy Certification Center in Japan defines "green electric power" as described above, in general, "green electric power" may be defined in each country as electric power generated by use of an energy source which is low in environmental load. The interpretation of the term "green electric power" may differ among various countries. For example, electric power produced by nuclear power generation may be considered as green electric power in some cases. Accordingly, the "green electric power" in the present invention is not necessarily defined as described above.

The determination section may determine whether or not the electric power supplied to the electric apparatus contains electric power produced through in-house power generation. By virtue of this configuration, the informing mode of the information provision section changes depending on whether or not the electric power supplied to the electric apparatus contains electric power produced through in-house power generation. The information provision section informs use of electric power containing electric power produced through in-house power generation, in a specific informing mode different from that in the case where electric power which does not contain electric power produced through in-house power generation is used. Accordingly, through recognition of the specific informing mode, a user of the electric apparatus can have assurance for use of electric power produced through in-house power generation. Such assurance motivates the user to use electric power produced through in-house power generation. As a result, use of electric power produced through in-house power generation is promoted, whereby use of commercial electric power decreases. Therefore, electric bill can be lowered.

Preferably, the information provision section visually or auditorily provides the information regarding the electric power supplied to the electric apparatus. In the case where the information is auditorily provided, preferably, the information provision section is a speaker, and the information provision control section controls the speaker such that sound produced from the speaker changes in accordance with the result of the determination by the determination section. For example, the information provision control section may control the speaker such that the tone of the sound produced from the speaker changes in accordance with the result of the determination by the determination section, or a different piece of music is produced from the speaker in accordance with the result of the determination by the determination section.

Also, in the case where the information is visually provided, preferably, the information provision section is a display section for displaying the information regarding the electric power supplied to the electric apparatus, and the information provision control section is a display control section for controlling the display section such that the display mode of the display section changes in accordance with the result of the determination by the determination section. By virtue of this configuration, through visual recognition of the display mode of the display section attached to the electric apparatus, the user of the electric apparatus and/or people around the electric apparatus can recognize that the specific electric power is used for operation of the electric apparatus.

In this case, preferably, the display control section controls the display section such that the display color of the display section changes in accordance with the result of the determination by the determination section. For example, in the case where the determination section determines that the electric power supplied to the electric apparatus contains the specific electric power, the display control section controls the display section such that the display color of the display section becomes a first display color (e.g., green); and, in the case where the determination section determines that the electric power supplied to the electric apparatus does not contain the specific electric power, the display control section controls the display section such that the display color of the display section becomes a second display color (e.g., red). By virtue of this configuration, through visual recognition of the display color of the display section attached to the electric apparatus, the user of the electric apparatus and/or people around the electric apparatus can intuitively recognize that the specific electric power is used for operation of the electric apparatus.

Preferably, the electric apparatus is an electric vehicle which includes a battery and an electric motor and which operates upon supply of electric power from the battery to the electric motor; and the display section is attached at least to an exterior portion of the electric vehicle. By virtue of the above-described configuration, through visual recognition of the display mode of the display section attached to the exterior portion of the electric vehicle, the people around the electric vehicle recognize that the specific electric power (for example, green electric power or electric power produced by in-house power generation) is being used for travel of the electric vehicle, and pay attention to the driver of the electric vehicle. Such attention further motivates the driver of the electric vehicle to use the specific electric power. As a result, use of the specific electric power is promoted further. Moreover, it is possible to prompt the people around the electric vehicle to use the specific electric power. Also, according to the present invention, the fact that the electric vehicle is using the specific electric power (particularly, green electric power) can be reported to a management center of a parking lot or the like. The management center can preferentially permit parking of an electric vehicle using the specific electric power on the basis of the provided information. By means of differentiating the contents of services between the case where the specific electric power is used and the case where the specific electric power is not used, use of the specific electric power (particularly, green electric power) can be spread further.

Preferably, a badge (so-called emblem) which is attached to the exterior portion of the electric vehicle for representing the vehicle serves as the display section. Since the emblem of the vehicle is disposed at a conspicuous portion of the exterior portion. Therefore, as a result of the emblem serving as the display section, during travel of the vehicle, the people around the electric vehicle recognize more readily the fact that the specific electric power (e.g., green electric power or electric power produced by in-house power generation) is being used for travel of the electric vehicle.

The term "electric vehicle" used in relation to the present invention represents a vehicle which includes a battery and operates by use of electric power stored in the battery. Accordingly, the electric vehicle of the present invention includes an electric car (EV), a plug-in hybrid car (PHV), an electric autobicycle, an electric bicycle, etc.

In the case where electric power is supplied to the electric apparatus by use of a battery, preferably, the determination section is configured as follows. When the net quantity of electric power supplied from the battery to the electric apparatus for operation of the electric apparatus (net power consumption) is less than the quantity of the specific electric power stored in the battery, the determination section determines that the specific electric power is contained in the electric power supplied from the battery to the electric apparatus. When the net quantity of electric power supplied from the battery to the electric apparatus for operation of the electric apparatus is greater than the quantity of the specific electric power stored in the battery, the determination section determines that the specific electric power is not contained in the electric power supplied from the battery to the electric apparatus.

By virtue of this configuration, in the case where the specific electric power (green electric power or electric power produced by in-house power generation) is stored in the battery, the informing mode of the information provision section changes depending on whether or not an electric power quantity corresponding to the quantity of the specific electric power stored in the battery has been consumed. In the case where the quantity of electric power supplied from the battery to the electric apparatus for operation of the electric apparatus (power consumption) is less than the quantity of the specific electric power stored in the battery, the information provision section informs the fact that electric power containing the specific electric power is used, in a specific informing mode different from that in the case where the power consumption is greater than the quantity of the specific electric power stored in the battery. That is, the informing mode of the information provision section is controlled such that the quantity of the specific electric power stored in the battery is reflected in the change of the informing mode of the information provision section. Accordingly, the user of the electric apparatus attempts to charge the specific electric power into the battery in a greater quantity. Thus, use of the specific electric power is promoted.

MODE FOR CARRYING OUT THE INVENTION

An embodiment of the present invention will now be described.

Figure 1:
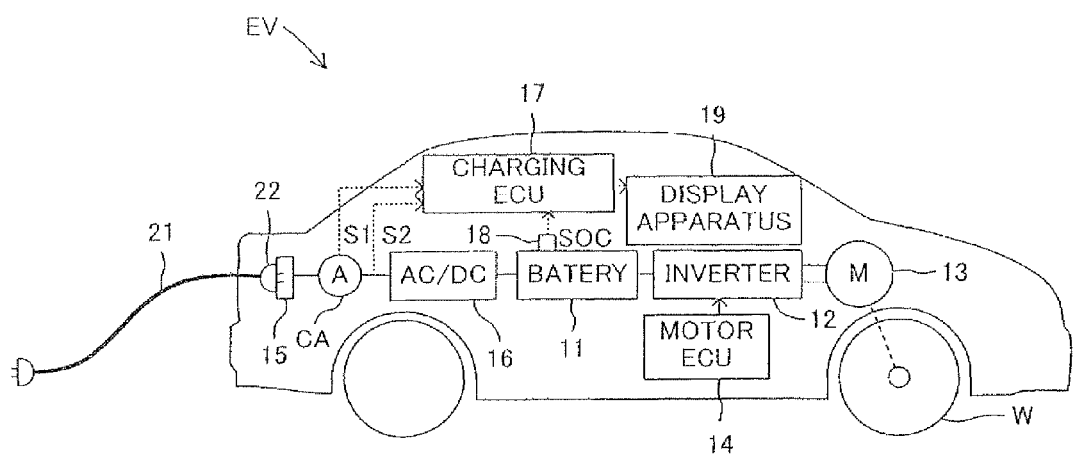
FIG. 1 is a schematic diagram of an electric vehicle equipped with a display apparatus according to an embodiment of the present invention.

FIG. 1 is a schematic diagram of an electric vehicle equipped with a display apparatus (electric power information provision apparatus) according to the present embodiment. This electric vehicle, which is denoted by EV, includes a battery 11, an inverter 12, an electric motor 13, and a motor control unit (motor ECU) 14. The inverter 12 receives DC electric power from the battery 11, and converts the received DC electric power to AC electric power. The electric motor 13 operates upon reception of AC electric power from the inverter 12. Wheels W rotate when the electric motor 13 operates. The motor ECU 14 controls the output of the inverter 12 in accordance with a driver's driving operation.

Also, the electric vehicle EV includes a power reception connector 15, an AC/DC converter 16, and a charge control unit (charging ECU) 17. A plug 22 of a connection cable for charging 21 can be connected to the power reception connector 15. The power reception connector 15 is electrically connected to the AC/DC converter 16. The AC/DC converter 16 receives AC electric power from the power reception connector 15, converts the received AC electric power to DC electric power, and supplies the DC electric power to the battery 11. The charging ECU 17 is a microcomputer which includes a CPU, ROM, RAM, and another memory device, and controls the charging of the battery 11. An SOC detection sensor 18 is attached to the battery 11 in order to detect SOC (state of charge: %) representing the percent remaining capacity of the battery 11. A signal representing the SOC detected by the SOC detection sensor 18 is input to the charging ECU 17.

Moreover, the electric vehicle EV includes a display apparatus 19. This display apparatus 19 displays information regarding electric power supplied to the electric motor 13 when the electric vehicle EV is operating. In particular, the display apparatus 19 displays whether or not the supplied electric power contains green electric power.

Figure 2:
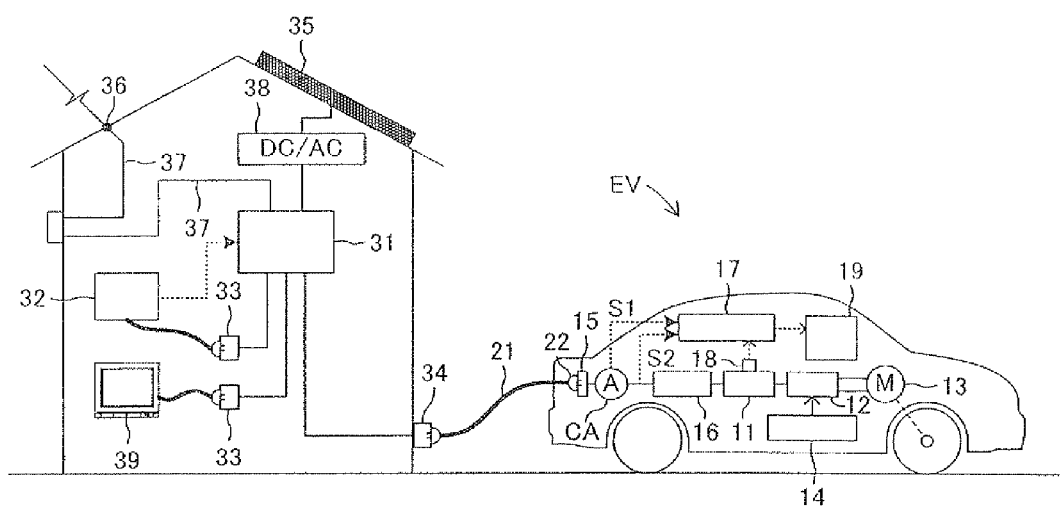
FIG. 2 is a schematic diagram showing an example of a system for charging the electric vehicle.

FIG. 2 is a schematic diagram showing an example of a system for charging the electric vehicle EV. This charging system is provided inside a house. This charging system includes a distribution board 31, a control panel 32, indoor plug sockets 33, an outdoor plug socket 34, and a solar panel 35. Commercial electric power (AC electric power) is supplied to the distribution board 31 via an electric power line 37 extending from an electric power service entrance 36 to the interior of the house. Notably, in the present embodiment, the commercial electric power supplied from the electric power service entrance 36 is not green electric power; for example, is electric power obtained through thermal power generation. When the commercial electric power is used, an electric bill is collected.

The solar panel 35 is a solar power generation apparatus, and is attached to a roof or the like. The electric power generated through solar power generation by making use of the solar panel 35 is green electric power. This electric power is also electric power produced through in-house power generation. This electric power is converted to AC electric power by the DC/AC converter 38, and then supplied to the distribution board 31.

The indoor plug sockets 33 and the outdoor plug socket 34 are connected to the distribution board 31 via electric power lines. When a plug connected to an electric apparatus (an electric load) is plugged into one of these plug sockets 33 and 34, electric power is supplied to the electric apparatus.

As described above, commercial electric power is supplied from the electric power service entrance 36 to the distribution board 31, and green electric power generated through in-house power generation is supplied from the solar panel 35 to the distribution board 31. These supplied electric powers are distributed to electric apparatuses connected to the indoor plug sockets 33 and the outdoor plug socket 34. The distribution board 31 includes a switch (not shown). Through operation of this switch, the commercial electric power supplied from the electric power service entrance 36 and the green electric power supplied from the solar panel 35 are selectively supplied to the plug sockets 33 and 34. This switch operates in response to an operator's operation of the control panel 32.

Figure 3:
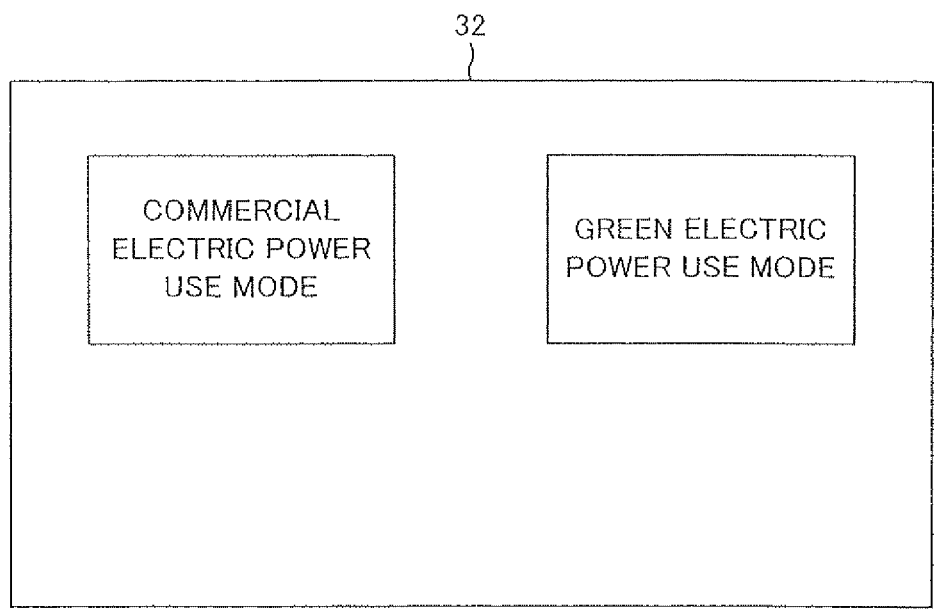
FIG. 3 is an illustration showing an example of a screen displayed on a control panel.

FIG. 3 is an illustration showing an example of a screen displayed on the control panel 32. Icons for selecting a commercial electric power use mode and a green electric power use mode are displayed on the control panel 32. When the operator presses the icon for the commercial electric power use mode, the switch provided on the distribution board 31 operates such that the commercial electric power supplied from the electric power service entrance 36 is supplied to the plug sockets 33 and 34. When the operator presses the icon for the green electric power use mode, the switch provided in the distribution board 31 operates such that the green electric power generated through in-house power generation by making use of the solar panel 35 is supplied to the plug sockets 33 and 34.

In the case where the electric vehicle EV is charged by such a charging system, as shown in FIG. 2, the power reception connector 15 provided on the electric vehicle EV and the outdoor plug socket 34 are electrically connected via the connection cable for charging 21. Subsequently, the operator operates the control panel 32 so as to supply the commercial electric power or the green electric power to the outdoor plug socket 34. Thus, the AC electric power supplied to the power reception connector 15 is converted to DC electric power by the AC/DC converter 16, and the DC electric power is supplied to the battery 11. In this manner, the battery 11 is charged.

As shown in FIGS. 1 and 2, an ammeter CA is provided in a wiring line between the power reception connector 15 provided on the electric vehicle EV and the AC/DC converter 16. A signal (charging current signal S1) representing the magnitude of current detected by the ammeter CA is input to the charging ECU 17.

A signal is superimposed on the commercial electric power supplied from the electric power service entrance 36, the signal representing that the electric power is not green electric power. Another signal is superimposed on the green electric power generated through solar power generation by making use of the solar panel 35, the signal representing that the electric power is green electric power. These signals (electric power type signals S2) are input to the charging ECU 17 during charging of the electric vehicle EV.

When the input electric power type signal S2 represents that the supplied electric power is green electric power, the charging ECU 17 computes the quantity of green electric power charged into the battery 11 (the green power quantity) on the basis of a period of time during which the electric power type signal S2 is input, and the charging current signal S1. The computed green power quantity is stored in the memory device as an electric power quantity A. Notably, the charging ECU 17 memorizes, as the electric power quantity A, the quantity of green electric power charged into the battery 11 between a time from when the electric vehicle EV stops its operation to when the electric vehicle EV starts its operation the next time. That is, in the case where charging operating is performed two times in the period between the time when the electric vehicle EV stops its operation and the time when the electric vehicle EV starts its operation the next time, the sum of the green power quantity charged during the first charging operation and the green power quantity charged during the second charging operation is memorized as the electric power quantity A.

Figure 4:
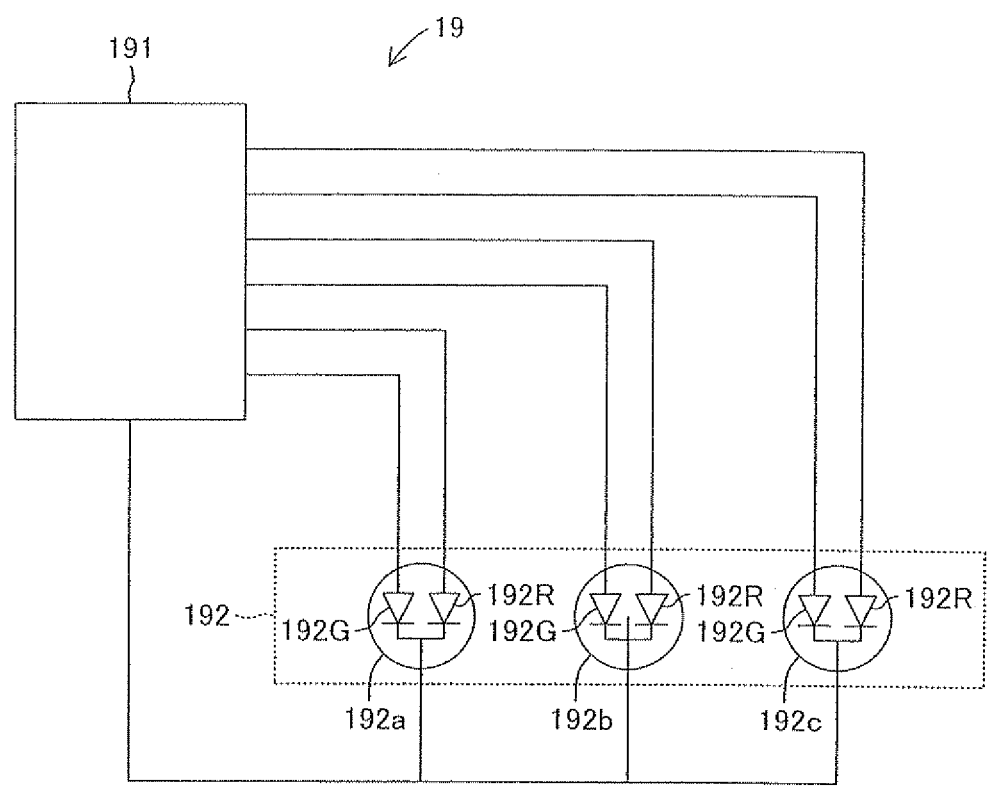
FIG. 4 is a diagram schematically showing the configuration of the display apparatus.

FIG. 4 is a diagram schematically showing the configuration of the display apparatus 19 provided in the electric vehicle EV. The display apparatus 19 includes a display ECU 191 and a display section 192. The display ECU 191 is a microcomputer which includes a CPU, ROM, RAM, and another memory device. In the present embodiment, the display section 192 is composed of a first display section 192a, a second display section 192b, and a third display section 192c. The first display section 192a is provided inside the cabin of the electric vehicle EV, and the second display section 192b and the third display section 192c are attached to the exterior portion of the electric vehicle EV.

Figure 5:
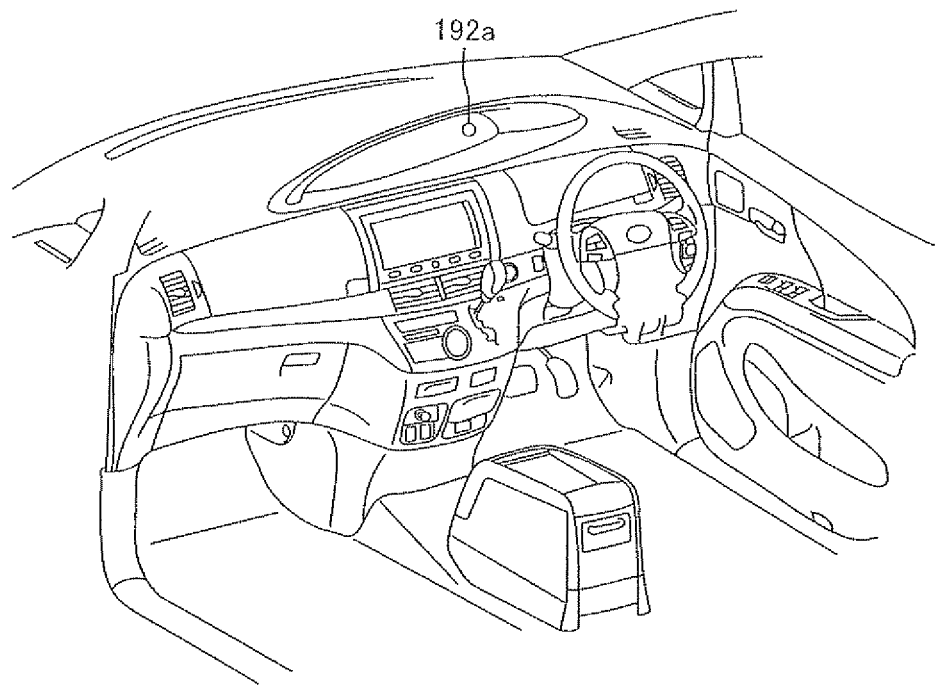
FIG. 5 is a schematic view showing the interior of the cabin of the electric vehicle.
Figure 6:
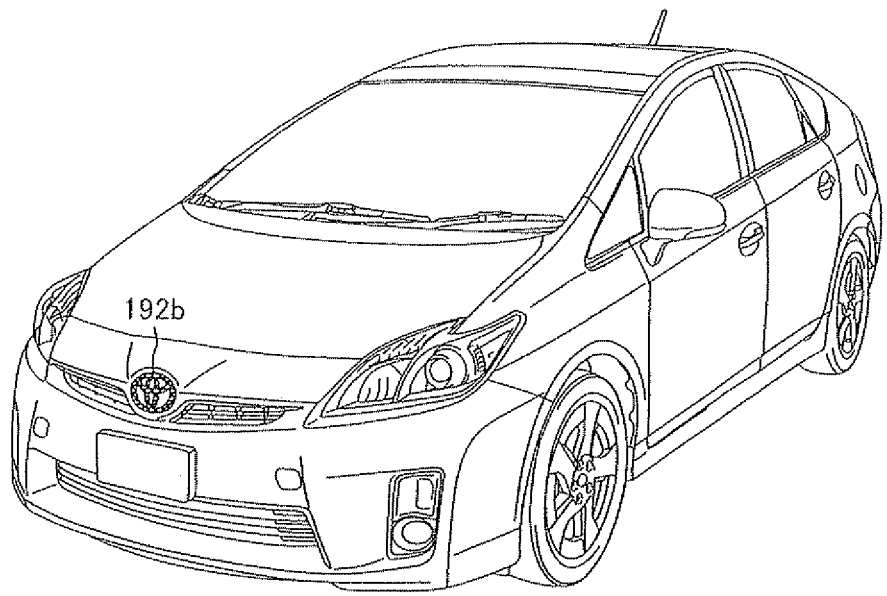
FIG. 6 is an external view of the electric vehicle as viewed obliquely from the front side.
Figure 7:
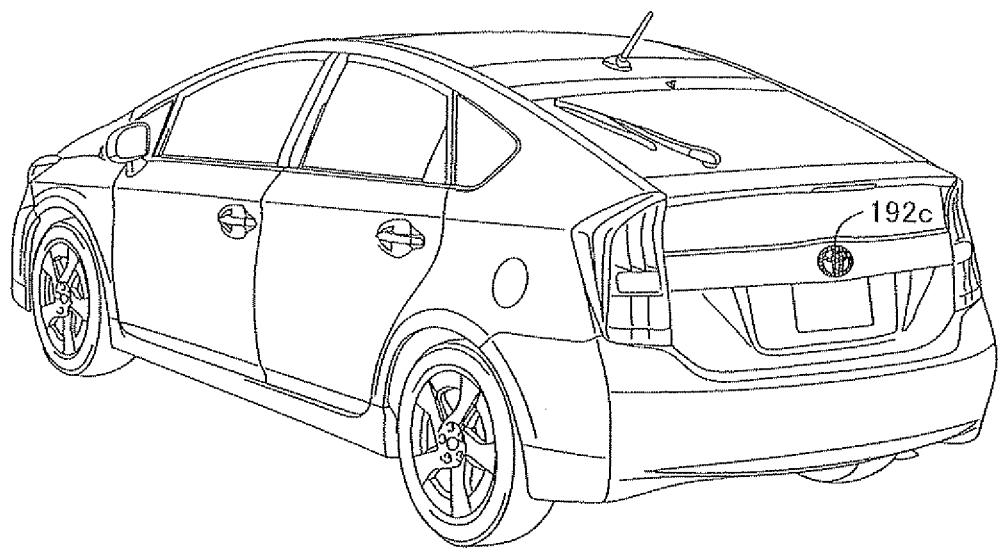
FIG. 7 is an external view of the electric vehicle as viewed obliquely from the rear side.

FIG. 5 is a schematic view showing the interior of the cabin of the electric vehicle EV. The first display section 192a is disposed inside an instrument panel provided in front of a driver's seat. FIG. 6 is an external view of the electric vehicle EV as viewed obliquely from the front side, and FIG. 7 is an external view of the electric vehicle EV as viewed obliquely from the rear side. As shown in these drawings, emblems representing the vehicle are attached to a front portion and a rear portion of the exterior portion of the electric vehicle EV. In the present embodiment, the emblems represent the manufacturer of the vehicle. The emblem attached to the front portion also serves as the second display section 192b. The emblem attached to the rear portion also serves as the third display section 192c.

As shown in FIG. 4, each of the first display section 192a, the second display section 192b, and the third display section 192c is composed of a single or a plurality of two-color LED lamps. Each two-color LED lamp is composed of a green LED 192G which emits green light when energized, and a red LED 192R which emits red light when energized. Energization of these LEDs is controlled by the display ECU 191 through execution of a display control routine.

Figure 8:
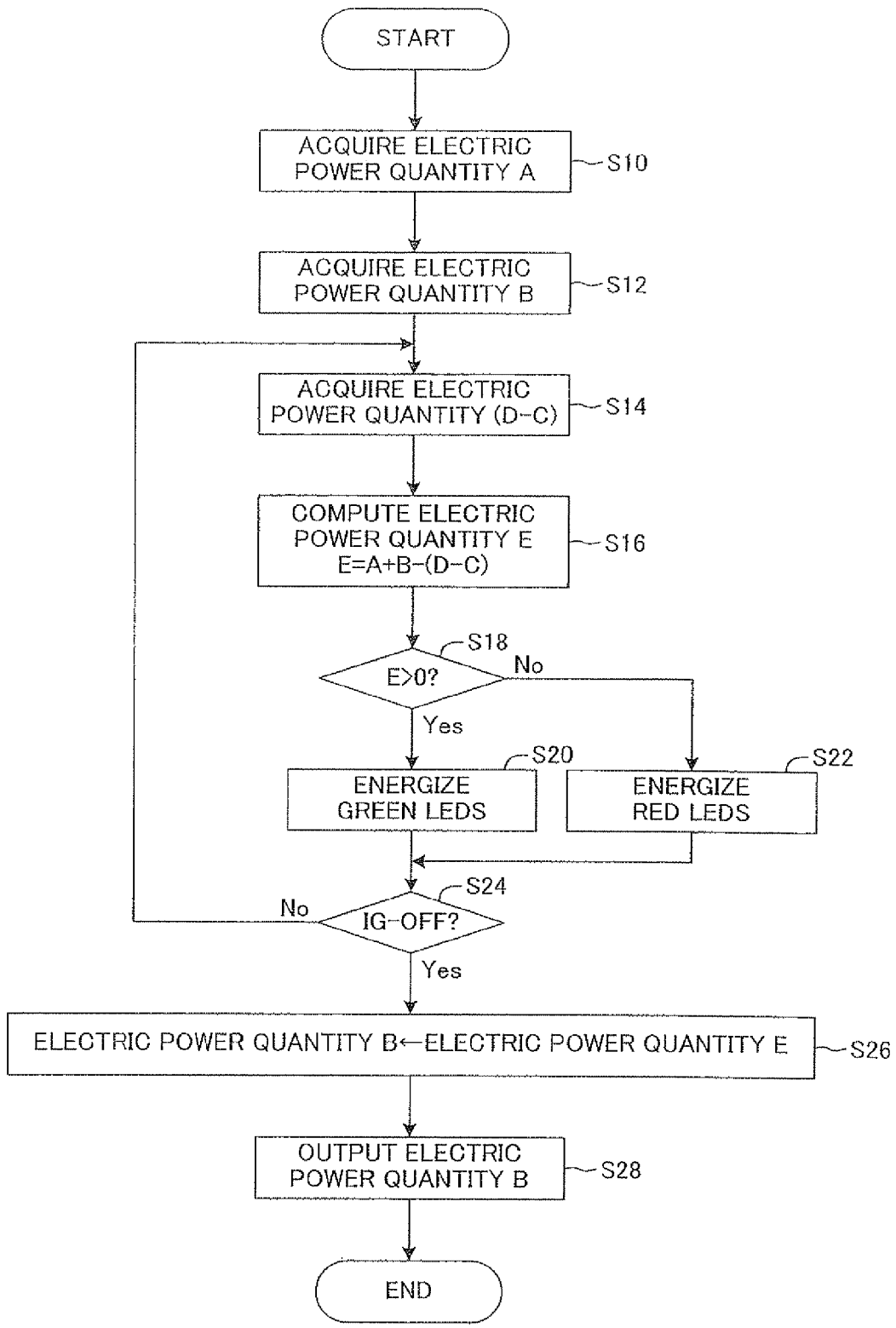
FIG. 8 is a flowchart representing a display control routine executed by a display ECU.

FIG. 8 is a flowchart representing the display control routine executed by the display ECU 191. This routine is executed while the electric vehicle EV is operated. When this routine is started, first, the display ECU 191 acquires the electric power quantity A at step (hereinafter, step will be abbreviated to "S") 10. As described above, the electric power quantity A is the quantity of green electric power charged into the battery 11 during a period between a time when the electric vehicle EV stopped its previous (last) operation and the present time. The display ECU 191 acquires the electric power quantity A by receiving it from the charging ECU 17.

Next, in S12, the display ECU 191 acquires an electric power quantity B. The electric power quantity B is the quantity of green electric power remained in the battery 11 immediately after the electric vehicle EV stopped its previous operation. This electric power quantity B is stored in the memory device of the charging ECU 17 immediately after the electric vehicle EV stopped its previous operation. The display ECU 191 acquires the electric power quantity B by receiving it from the charging ECU 17.

Subsequently, in S14, the display ECU 191 obtains an electric power quantity (D−C). The electric power quantity (D−C) represents the difference between an electric power quantity D and an electric power quantity C. The electric power quantity D is the cumulative quantity of electric power having been supplied from the battery 11 to the electric motor 13 during the present travel of the electric vehicle EV; i.e., the quantity of electric power having been consumed for travel of the electric vehicle EV. The electric power quantity C is the cumulative quantity of electric power having been charged into to the battery 11 by regeneration of the electric motor 13 when the electric vehicle EV is traveling (during the present travel) and green electric power is assumed to be contained in the electric power supplied from the battery 11 to the electric motor 13; i.e., the quantity of regenerated green electric power. Accordingly, the electric power quantity (D−C) can be said to be the net power consumption computed in consideration of the quantity of regenerated green electric power. The electric power quantity (D−C) is computed by the charging ECU 17. The display ECU 191 acquires the electric power quantity (D−C) by receiving it from the charging ECU 17.

Figure 9:
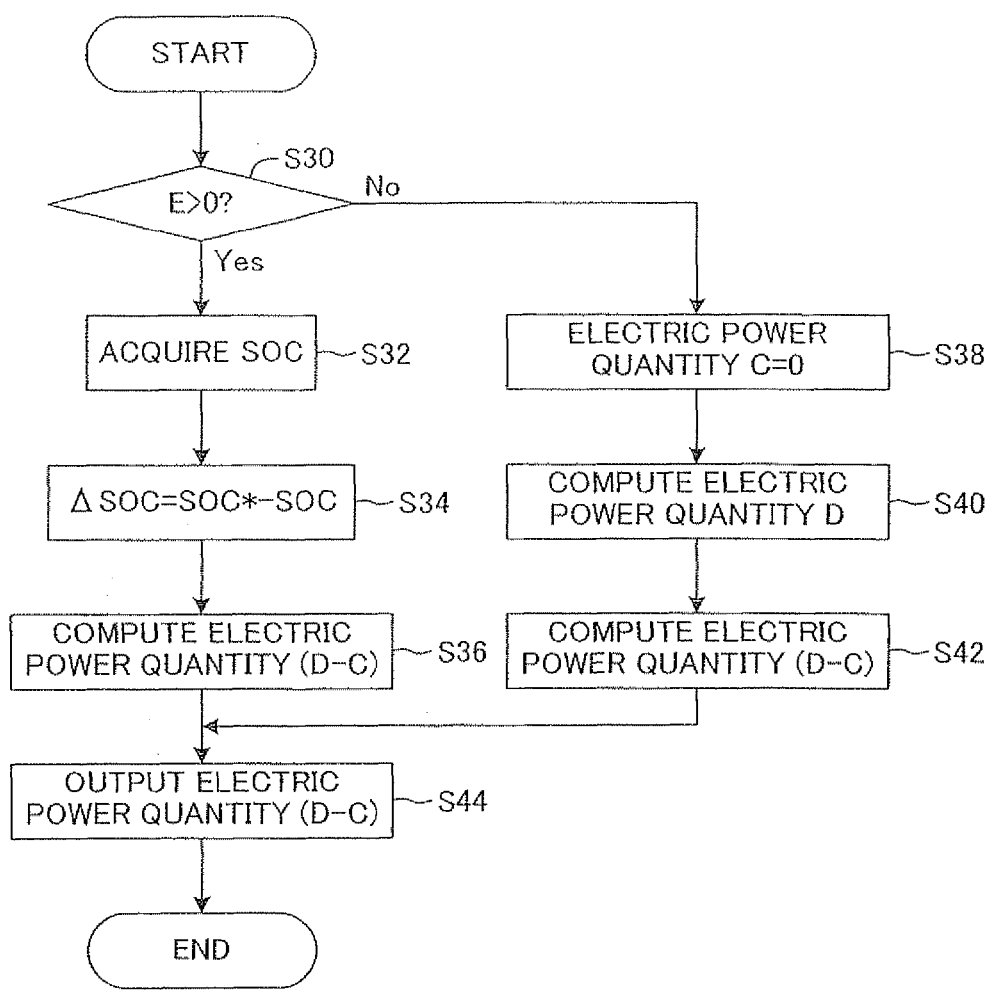
FIG. 9 is a flowchart representing a computation routine executed by a charging ECU in order to computer the electric power quantity (D−C).

FIG. 9 is a flowchart representing a computation routine executed by the charging ECU 17 in order to compute the electric power quantity (D−C). This routine is repeatedly executed at predetermined short intervals when the electric vehicle EV is operating. When this routine is started, first, the charging ECU 17 determines in S30 where or not an electric power quantity E is greater than 0. The electric power quantity E is the quantity of green electric power which is assumed to remain in the battery 11 at the present. In the case where the electric power quantity E is greater than 0, green electric power is assumed to remain in the battery 11. In the case where the electric power quantity E is equal to or less than 0, green electric power is assumed not to remain in the battery 11. The electric power quantity E is computed by the display ECU 191. The charging ECU 17 receives the electric power quantity E from the display ECU 191. A method of computing the electric power quantity E will be described later.

In the case where the electric power quantity E is greater than 0 (S30: Yes), green electric power is assumed to remain in the battery 11. Therefore, in the case where the electric power quantity E is greater than 0, it is assumed that green electric power is contained in the electric power supplied from the battery 11 to the electric motor 13 during travel of the electric vehicle EV, and the green electric power is used for the travel of the electric vehicle EV. In this case, the charging ECU 17 proceeds to S32, and acquires an SOC input from the SOC detection sensor 18. Subsequently, the charging ECU 17 computes a change amount (ΔSOC) of the SOC (S34). This ΔSOC can be obtained by subtracting the SOC obtained in S32 from an initial SOC (SOC*). Notably, the initial SOC* is an SOC acquired from the SOC detection sensor 18 immediately after the electric vehicle EV started its operation.

Subsequently, the charging ECU 17 computes the electric power quantity (D−C) on the basis of ΔSOC (S36). The SOC represents the charging ratio (%) of the battery 11; that is, the ratio of the quantity of electric power currently stored in the battery 11 to the quantity of electric power stored in the battery 11 in a fully charged state. Therefore, ΔSOC represents the amount of change in the quantity of electric power stored in the battery 11. The change amount of the electric power quantity is represented by an electric power quantity obtained by subtracting the cumulative quantity of electric power having been charged into the battery 11 by means of regeneration from the cumulative quantity of electric power having been used for travel of the electric vehicle EV (the electric power quantity D). The cumulative quantity of electric power charged into the battery 11 by means of regeneration corresponds to the electric power quantity C in the case where green electric power is assumed to be contained in the electric power supplied from the battery 11 to the electric motor 13; i.e., in the case where the electric power quantity E is greater than 0. As can be understood from these, in the case where the electric power quantity E is greater than 0, a correlation exist between ΔSOC and the electric power quantity (D−C). The electric power quantity (D−C) can be computed on the basis of this correlation.

After having computed the electric power quantity (D−C) on the basis of ΔSOC in S36, the charging ECU 17 proceeds to S44, and outputs the computed electric power quantity (D−C) to the display ECU 191. After that, the charging ECU 17 ends the current execution of this routine.

In the case where the electric power quantity E is equal to or less than 0 (S30: No), green electric power is assumed not to remain in the battery 11. Accordingly, in the case where the electric power quantity E is equal to or less than 0, it is assumed that green electric power is not contained in the electric power supplied from the battery 11 to the electric motor 13 during travel of the electric vehicle EV, and no green electric power is used for travel of the electric vehicle EV. In this case, the charging ECU 17 proceeds to S38. When the electric power quantity E is equal to or less than 0, the quantity of regenerated green electric power is zero. Therefore, the charging ECU 17 sets the electric power quantity C to zero in S38. Subsequently, in S40, the charging ECU 17 computes the electric power quantity D.

As described above, the electric power quantity D is the cumulative quantity of electric power having been used for travel of the electric vehicle EV. This electric power quantity D can be obtained from the travel distance of the electric vehicle EV and an electricity consumption rate. The electricity consumption rate refers to a distance over which the vehicle can travel by using a unit quantity of electric power. Therefore, the electric power quantity D used for travel of the electric vehicle EV is computed by dividing the travel distance by the electricity consumption rate. The electricity consumption rate can be computed, for example, on the basis of the relation between the charging quantity and the travel distance of the electric vehicle EV in the past.

After that, the charging ECU 17 proceeds to S42, and computes the electric power quantity (D−C). Since the electric power quantity C has been set to 0 when the electric power quantity E is equal to or less than 0, the electric power quantity (D−C) corresponds to the electric power quantity D. Subsequently, the charging ECU 17 proceeds to S44, and outputs the computed electric power quantity (D−C) to the display ECU 191. After that, the charging ECU 17 ends the current execution of this routine.

The display ECU 191 proceeds to S16 of FIG. 8 after having acquired the electric power quantity (D−C) from the charging ECU 17, and computes the electric power quantity E. As described above, the electric power quantity E is the green power quantity assumed to remain in the battery 11 at the present. In the present embodiment, the electric power quantity E is computed by the following equation.

Electric power quantity $E$=Electric power quantity $A$+Electric power quantity $B$−Electric power quantity$(D-C)$ As shown in the above-described equation, the electric power quantity E is obtained by subtracting the electric power quantity (D−C) from the sum of the electric power quantity A and the electric power quantity B. The electric power quantity A is the quantity of green electric power charged into the battery 11 during a period between a time when the electric vehicle EV stopped its previous (last) operation and a time when the electric vehicle EV starts its present operation. The electric power quantity B is the quantity of green electric power remaining in the battery 11 when the electric vehicle EV stopped its previous operation. Therefore, the sum of the electric power quantity A and the electric power quantity B represents the quantity of green electric power having been stored in the battery 11 before the start of the operation of the electric vehicle EV. Meanwhile, the electric power quantity (D−C) represents the power consumption up to the present, which is calculated during the present travel of the electric vehicle EV in consideration of the quantity of regenerated green electric power.

In the present embodiment, it is assumed that, when the electric vehicle EV travels, the green electric power stored in the battery 11 is consumed first. Accordingly, the electric power quantity E, which is obtained by subtracting the power consumption (D−C) calculated in consideration of the quantity of regenerated green electric power from the sum of the electric power quantity A and the electric power quantity B (the quantity of green electric power charged into the battery 11), represents the quantity of green electric power assumed to remain in the battery 11 at the present.

Next, the display ECU determines in S18 whether or not the electric power quantity E is greater than 0.

In the case where the electric power quantity E is greater than 0 (S18: Yes), green electric power is assumed to remain in the battery 11. Therefore, it is assumed that green electric power is contained in the electric power supplied from the battery 11 to the electric motor 13 during travel of the electric vehicle EV. In this case, the display ECU 191 proceeds to S20, and energizes and controls the display sections 192a, 192b, and 192c such that the green LEDs 192G of the display sections 192a, 192b, and 192c are turned on, and the red LEDs 192R thereof are turned off. Thus, the display sections 192a, 192b, and 192c emit green light.

Meanwhile, in the case where the electric power quantity E is equal to or less than 0 (S18: No), green electric power is assumed not to remain in the battery 11. Therefore, it is assumed that no green electric power is contained in the electric power supplied from the battery 11 to the electric motor 13 during travel of the electric vehicle EV. In this case, the display ECU 191 proceeds to S22, and energizes and controls the display sections 192a, 192b, and 192c such that the red LEDs 192R of the display sections 192a, 192b, and 192c are turned on, and the green LEDs 192G thereof are turned off. Thus, the display sections 192a, 192b, and 192c emit red light.

After that, the display ECU proceeds to S24, and determines whether or not the ignition (operation switch) of the electric vehicle EV is turned off. In the case where the ignition is not turned off (S24: No), the display ECU returns to S14. Then, the display ECU again performs the above-described operation of acquiring the electric power quantity (D−C), computing the electric power quantity E, and energizing and controlling the display sections 192a, 192b, and 192c on the basis of the computed electric power quantity E. Meanwhile, in the case where the ignition is turned off (S24: Yes), the display ECU proceeds to S26, and makes the electric power quantity B equal to the electric power quantity E, and outputs the electric power quantity B to the charging ECU 17 (S28). The charging ECU 17 stores the received electric power quantity B in the memory device. After that, the display ECU 191 ends the present routine.

As a result of execution of the above-described display control routine by the display ECU 191, the electric power quantity E is computed periodically during travel of the electric vehicle EV. In the case where the computed electric power quantity E is greater than 0, the display sections 192a, 192b, and 192c emit green light. Meanwhile, in the case where the computed electric power quantity E is equal to or less than 0, the display sections 192a, 192b, and 192c emit red light. As described above, according to the display apparatus 19 of the present embodiment, the supply of electricity to the display sections 192a, 192b, and 192c is controlled such that the display mode (in the present embodiment, display color) of each of the display sections 192a, 192b, and 192c changes depending on the result of determination as to whether or not the electric power quantity E is greater than 0; i.e., whether or not green electric power is contained in the electric power supplied to the electric motor 13 of the electric vehicle EV.

Figure 10:
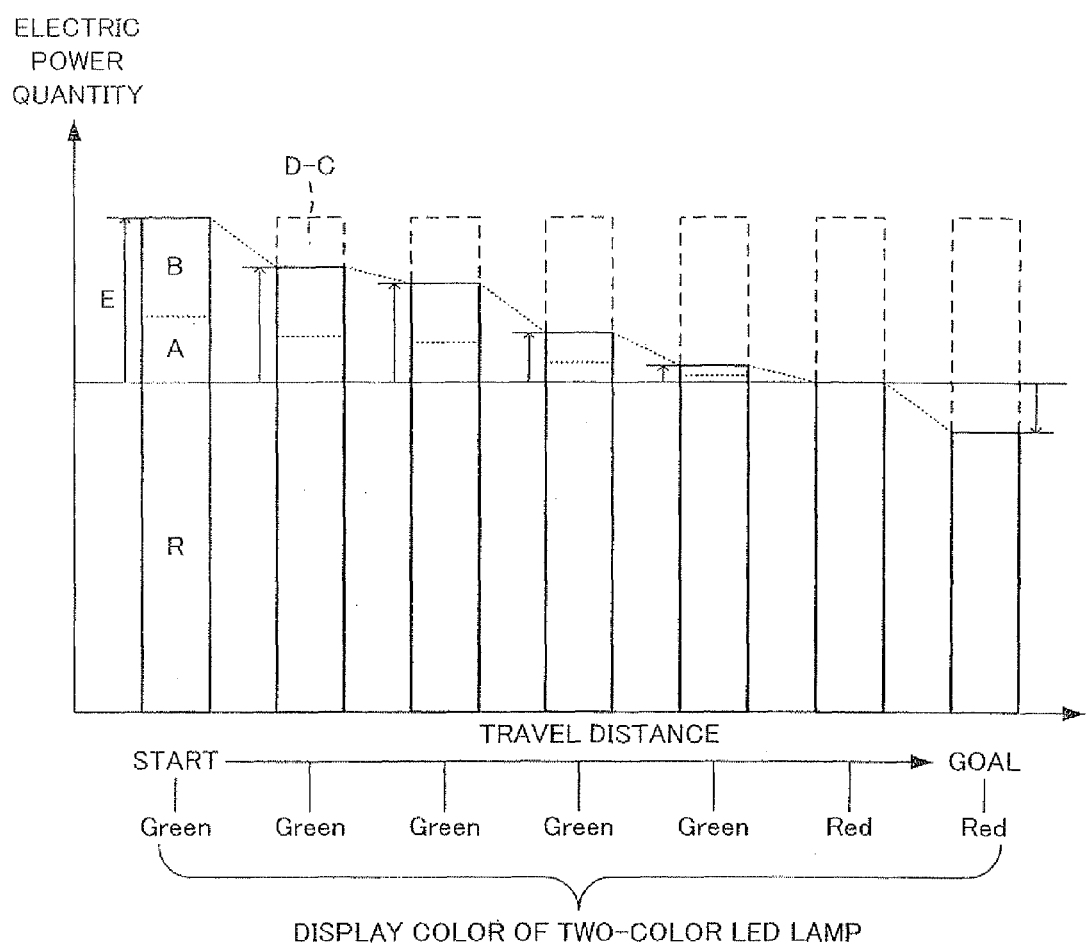
FIG. 10 is a graph showing a change in the quantity of electric power stored in a battery for the case where the electric vehicle travels from a start point to a destination.

FIG. 10 is a graph showing a change in the quantity of electric power stored in the battery 11 for the case where the electric vehicle EV travels from a starting point (START) to a destination (GOAL). In FIG. 10, the horizontal axis represents travel distance, and the vertical axis represents the electric power quantity. Also, the length of each bar in the graph represents the quantity (remaining quantity) of the electric power stored in the battery 11. A portion of each bar indicated by A represents the electric power quantity A, and a portion of each bar indicated by B represents the electric power quantity B. Each of the electric power quantity A and the electric power quantity B is the quantity of green electric power stored in the battery 11 before the start of operation of the electric vehicle EV. Therefore, these electric power quantities are fixed values. Also, a portion of each bar indicated by R represents the quantity of electric power which is not green electric power. Moreover, a portion which is located above each bar and is indicated by a broken line represents the net power consumption (D−C) computed in consideration of the quantity of regenerated green electric power.

As shown in FIG. 10, the electric power quantity (D−C) increases with the travel distance of the electric vehicle EV. However, the increase amount of the electric power quantity (D−C) changes because of influence of the quantity C of the regenerated green power. Also, as described above, in the present embodiment, it is assumed that, of the electric power stored in the battery 11, green electric power is consumed first. Accordingly, when the electric vehicle EV starts its travel, first, the green electric power (the electric power quantity A and the electric power quantity B) is consumed. Of the green electric power, unconsumed electric power is indicated by an arrow in the drawing. The quantity of electric power represented by the length of this arrow is the electric power quantity E. In the case where the arrow is directed upward, the electric power quantity E is greater than 0, and, in the case where the arrow is directed downward, the electric power quantity E is less than 0.

In the case where the electric power quantity E is greater than 0, the two-color LED lamps of the display sections 192a, 192b, and 192c emit green light. By emitting green light, the first display section 192a provided in the cabin of the electric vehicle EV informs the driver that green electric power is being used. Thus, the driver can have assurance for contribution to environmental protection through use of green electric power. Such assurance motivates the driver to use green electric power. As a result, use of green electric power is promoted.

Also, by emitting green light, the second display section 192*b* and the third display section 192*c* attached to the exterior portion of the electric vehicle EV inform people around the electric vehicle EV of the fact that green electric power is being used for travel of the electric vehicle EV. Thus, the people around the electric vehicle EV pay attention to the user of the electric vehicle EV. Such attention further motivates the user of the electric vehicle EV to use green electric power. As a result, use of green electric power is promoted further. Moreover, it is possible to prompt the people around the electric vehicle EV to use green electric power.

When the electric power quantity E becomes 0, the color of light emitted from the two-color LED lamps of the display sections 192*a*, 192*b*, and 192*c* is switched from green to red. The change of the display color of the first display section 192*a* from green to red motivates the driver of the electric vehicle EV to charge green electric power. As a result, use of green electric power is promoted.

As described above, the display apparatus 19 of the present embodiment includes the display section 192 which is attached to the electric vehicle EV operable upon supply of electric power thereto and displays information regarding the electric power supplied to the electric vehicle EV; a determination section (S18) which determines whether or not the electric power supplied to the electric vehicle EV contains green electric power; and a display control section (S20, S22) which controls the display section 192 such that the display color of the display section 192 changes in accordance with the result of the determination by the determination section.

In the case where the determination section (S18) determines that the electric power supplied to the electric vehicle EV contains green electric power (S18: Yes), the display control section (S20, S22) controls the display section 192 such that the display color becomes a first display color (green) (S20). In the case where the determination section (S18) determines that the electric power supplied to the electric vehicle EV does not contain green electric power (S18: No), the display control section (S20, S22) controls the display section 192 such that the display color becomes a second display color (red) (S22).

According to the display apparatus 19 of the present embodiment, the display color of the display section 192 changes depending on whether or not the electric power supplied to the electric vehicle EV contains green electric power. The display section 192 displays use of electric power containing green electric power by a specific display color (green) different from that in the case where electric power containing no green electric power is used. Accordingly, through recognition that the display color of the display section 192 is green, the driver has assurance for contribution to environmental protection through use of green electric power. Such assurance motivates the driver to use green electric power, whereby use of green electric power is promoted. Also, by means of the second display section 192*b* and the third display section 192*c* attached to the exterior portion of the electric vehicle EV, the fact that green electric power is being used for travel of the electric vehicle EV is displayed for people around the electric vehicle EV. Thus, the people around the electric vehicle EV pay attention to the driver of the electric vehicle EV. Such attention further motivates the driver of the electric vehicle EV to use green electric power.

As a result, use of green electric power is promoted further. Moreover, it is possible to prompt the people around the electric vehicle EV to use green electric power.

The emblems of the electric vehicle EV serve as the second display section 192*b* and the third display section 192*c*. The emblems of the vehicle are provided at conspicuous portions of the exterior of the vehicle. Therefore, as a result of the emblems serving as the display section 192, during travel of the electric vehicle EV, the people around the electric vehicle EV recognize more readily the fact that green electric power is being used for travel of the electric vehicle EV.

According to the present embodiment, the green electric power is produced through in-house power generation by making use of the solar panel 35 disposed on the house as shown in FIG. 2. Therefore, emission of green light from the display sections 192*a*, 192*b*, and 192*c* represents that the electric power produced through in-house power generation is contained in the electric power supplied to the electric vehicle EV. That is, by emitting green light, the display section informs the driver of the fact that the electric power produced through in-house power generation is being used for travel of the electric vehicle EV. Thus, the driver has assurance for use of electric power produced through in-house power generation. Such assurance motivates the driver to use electric power produced through in-house power generation. As a result, use of electric power produced through in-house power generation is promoted, whereby use of commercial electric power decreases. Therefore, electric bill can be lowered.

In the present embodiment, electric power is supplied to the electric vehicle EV (the electric motor 13) by making use of the battery 11. When the net power consumption (D−C) (the net quantity of electric power supplied from the battery 11 to the electric vehicle EV for travel of the electric vehicle EV) is smaller than the quantity of green electric power stored in the battery 11 (the electric power quantity A+the electric power quantity B); i.e., when the quantity E of green electric power assumed to remain in the battery 11 (=the electric power quantity A+the electric power quantity B−the electric power quantity (D−C)) is greater than 0, the determination section (S18) determines that green electric power is contained in the electric power supplied from the battery 11 to the electric vehicle EV. When the net power consumption (D−C) is equal to or greater than the quantity of green power stored in the battery 11 (=the electric power quantity A+the electric power quantity B); i.e., when the electric power quantity E is equal to less than 0, the determination section (S18) determines that green electric power is not contained in the electric power supplied from the battery 11 to the electric vehicle EV.

Therefore, the display color of the display section 192 changes depending on whether the electric power quantity corresponding to the quantity of green electric power stored in the battery 11 has been consumed as a result of travel of the electric vehicle EV. When the net power consumption (the net quantity (D−C) of electric power supplied from the battery 11 to the electric vehicle EV for travel of the electric vehicle EV) is less than the quantity of green electric power stored in the battery 11 (the electric power quantity A+the electric power quantity B) (the case where E>0), the display section 192 informs use of electric power containing green electric power, by emitting light of a display color (green) different from a display color (red) of light emitted by the display section 192 when the net power consumption (D−C) is greater than the quantity of green electric power stored in the battery 11 (the electric power quantity A+the electric power quantity B) (the case where E<0). That is, the display color of the display section 192 is controlled such that the quantity of green electric power stored in the battery 11 is reflected in the change of the display color of the display section 192. Accordingly, the driver of the electric vehicle EV tries to charge green electric power into the battery 11 in a greater quantity. Thus, use of green electric power is promoted.

Although the embodiment of the present invention has been described, the present invention is not limited thereto. In the above-described embodiment, there is shown an example in which the display apparatus 19, which serves as an electric power information provision apparatus, is provided on the electric vehicle EV. However, the electric power information provision apparatus may be attached to electric apparatuses other than the electric vehicle; for example, home appliances, such as a television 39 shown in FIG. 2. In this case, preferably, a lamp for providing electric power information is attached to the television 39.

In the above-described embodiment, there is shown an example in which the display section 192 is controlled such that the display color of the display apparatus 19 changes depending on whether or not green electric power is contained in the supplied electric power. However, the display section 192 may be controlled such that the display shape (for example, the shape of an light emitting area) of the display apparatus 19 changes depending on whether or not green electric power is contained in the supplied electric power. For example, the shape of the light emitting area may be controlled such that, in the case where green electric power is contained in the supplied electric power, the display section emits light from an area having a star-like shape; and, in the case where green electric power is not contained in the supplied electric power, the display section emits light from a rectangular area. Alternately, the display section may be controlled such that, in the case where green electric power is contained in the supplied electric power, a phrase "green electric power is currently being used" is displayed. Moreover, the display section may be controlled such that the manner of emission of light from the display section changes depending on whether or not green electric power is contained in the supplied electric power.

In the above-described embodiment, there is shown an example in which the result of the determination as to whether or not green electric power is contained in the supplied electric power is visually communicated by the display apparatus 19. However, the embodiment may be configured such that the electric power information provision apparatus is composed of a speaker and a speaker control apparatus, which controls the speaker such that the sound produced from the speaker changes depending on whether or not green electric power is contained in the supplied electric power. Alternately, the embodiment may be configured such that the result of the determination as to whether or not green electric power is contained in the supplied electric power is reported to a predetermined outside organization via wireless communication or the like. For example, the fact that green electric power is contained in the electric power supplied to an electric vehicle may be reported to a management center of a parking lot via wireless communication. The management center of the parking lot can preferentially permit parking of an electric vehicle using green electric power. Through spread of such a service, use of green electric power spreads further.

In the above-described embodiment, there is shown an example in which the charging ECU 17 determines whether or not the charged electric power is green electric power, on the basis of the electric power type information S2 superimposed on the electric power supplied to the battery 11 at the time of charging. However, other methods may be used so as to determine whether or not the charged electric power is green electric power. For example, the charging ECU 17 may be configured to acquire the operation state of the switch provided in the distribution board 31 via wireless communication or the like, and determine whether or not the charged electric power is green electric power, on the basis of the acquired operation state of the switch.

In the above-described embodiment, there is shown an example in which the information provision section is controlled such that its informing mode changes depending on the result of the determination as to whether or not green electric power is contained in the electric power supplied to the electric vehicle EV. However, the information provision section may be controlled such that its informing mode changes depending on whether or not specific electric power (for example, electric power produced through in-house power generation, or inexpensive electric power) other than green electric power is contained in the electric power supplied to the electric vehicle EV. As described above, the present invention can be modified without departing from the scope of the invention.

What is claimed is:

1. An electric power information provision apparatus comprising:
   a display section, which is attached to an electric vehicle operable upon supply of electric power thereto, the display section configured to provide information regarding the electric power supplied to the electric vehicle, the electric vehicle including a battery and an electric motor and operating upon supply of electric power from the battery to the electric motor;
   a determination section which determines whether or not specific electric power is contained in the electric power supplied to the electric vehicle; and
   a display control section which controls the display section such that a display mode of the display section changes depending on a result of the determination by the determination section, wherein
   the display section is attached at least to an exterior portion of the electric vehicle, and
   the determination section determines whether or not the specific electric power is contained in the electric power supplied to the electric vehicle based on (i) a quantity of the specific electric power stored in the battery before a start of an operation of the electric vehicle and (ii) electric power consumption up to a present time.

2. The electric power information provision apparatus according to claim 1, wherein the specific electric power is green electric power, and the determination section determines whether or not the electric power supplied to the electric vehicle contains the green electric power.

3. The electric power information provision apparatus according to claim 1, wherein the specific electric power is electric power produced through in-house power generation, and the determination section determines whether or not the electric power supplied to the electric vehicle contains the electric power produced through in-house power generation.

4. The electric power information provision apparatus according to claim 1, wherein the display control section controls the display section such that a display color of the display section changes in accordance with the result of the determination by the determination section.

5. The electric power information provision apparatus according to claim 1, wherein the display section is an emblem attached to the exterior portion of the electric vehicle for representing the vehicle.

6. The electric power information provision apparatus according to claim 2, wherein the display section is an emblem attached to the exterior portion of the electric vehicle for representing the vehicle.

7. The electric power information provision apparatus according to claim 3, wherein the display section is an emblem attached to the exterior portion of the electric vehicle for representing the vehicle.

8. The electric power information provision apparatus according to claim 1, wherein the display control section controls the display section to provide the information regarding the electric power supplied to the electric vehicle while the electric vehicle is moving.

* * * * *